Patented Mar. 10, 1942

2,275,499

UNITED STATES PATENT OFFICE 2,275,499

PLASTIC MOLDING MATERIAL

Elvin M. Bright, Dayton, Ohio, assignor to John M. Wallace, Cincinnati, Ohio, as trustee No Drawing. Application July 23, 1936, Serial No. 92,157

6 Claims. (Cl. 106—275)

This invention relates to a plastic molding material and more particularly to the ingredients thereof, the method of producing same and a coating therefor.

An object of this invention is to produce a plastic molding material that is cheap, easily produced from inexpensive raw materials, and that results in a finished product that is strong, durable and resistant to temperature changes.

Another object of this invention is to produce a plastic molding material that includes a bituminous product intermixed with sulphur fused with silicon or one or more of its compounds.

Another object of this invention is to produce a plastic molding material having variable strengths both in tension and compression, which strengths are altered by changing the ratios of the ingredients.

Another object of the invention is to intermittently drain the solvent used in dissolving the nitrocellulose material and to shrink the nitrocellulose material.

Another object of this invention is to harden the outer surface of plastic molding material after being molded.

Another object of this invention is to use a solvent for the nitrocellulose material that hardens the outer surface of articles molded from a bituminous compound upon the application of the nitrocellulose material.

Other objects and advantages reside in the proportion of the ingredients, the combination thereof and the mode of combining, as will become more apparent from the following description.

The nature of this invention is such that no drawings are deemed necessary.

In the past, bituminous compounds have been used that include sulphur and compounds of silicon, such as silica. The composition has been melted and used as paving and other usages where such a material meets the demand. Such paving material is greatly influenced by variations in temperature, the bituminous product, such as asphalt or the like, softening and becoming plastic in hot weather, especially so when exposed to the direct sun's rays, due to the color thereof. Furthermore, these products are very unsatisfactory for use in molding articles into definite shapes and sizes due to the great coefficient of expansion and the very marked tendency to soften when heated by higher normal atmospheric temperatures.

In these materials, as far as known, the silicates and any sulphur that the asphalt may contain, have not been fused, even though the pavement is applied while hot.

It has been found that by first fusing silicon dioxide, generally known as quartz, with sulphur in the absence of asphalt, the silicate or silicon compound forms a homogeneous mass with the sulphur. As it cools it forms a porous mass, having a porosity which resembles that of lava. The quality of the fused material is dependent to some extent upon the temperature of fusion.

If the mass before it is solidified is poured into a melted bituminous product and agitated, a homogeneous mass is produced that may be molded. The silicon or its compound, together with sulphur, seems to form a binding material for the bituminous product, giving the molded product rigidity and confining the bituminous product so as to prevent excessive expansion thereof. This results in a material that has a small coefficient of expansion that will not become soft and plastic even though exposed to the influence of the bright sun, as it seems to take several hundred degrees to melt the material after it has once set. This plastic molding material may be poured into cold molds before the material has solidified and then molded under pressure without the addition of heat. No extra heat is necessary to cure the material.

Instead of fusing the sulphur and silicon compound at a comparatively low temperature, these may be fused at a much higher temperature, resulting in a fused mass having a dark color, which mass is firmer and more rigid when it solidifies than the mass formed by fusing the sulphur and silicon compound at a lower temperature. The mass fused at the higher temperature may be dipped into water and suddenly removed, which causes the outer surface of the mass to solidify, thereby preventing oxidation of the sulphur and permitting the handling of the mass as a whole. This plastic mass having a shell of hard material may then be dumped into melted asphalt and the resulting compound after being thoroughly mixed into a homogeneous mass may be molded as above described. The product produced at the higher temperature is considerably harder, having greater strength and is not as easily fractured.

In order to increase the tensile strength of the molding material and also to lighten the same, fibrous material such as cotton or linen rags, jute butts that may have been shredded, or other suitable fibrous material, may be added. The resulting molded articles are impervious to water, practically unaffected by the elements, forming a good insulator, both to the conductivity of heat and the conductivity of electricity.

A composition consisting of 6 parts by weight of silicon dioxide fused with 6 parts of sulphur intermixed with 20 parts of Trinidad Lake asphalt and 3 parts of fibrous material has been found to result in a very satisfactory molding material.

Articles molded by the use of plastic molding material described above, have been found to be very durable and of improved quality if coated with a nitrocellulose coating. Especially is this the case when a nitrocellulose coating is applied that has been dissolved in a solution which may consist of sixty percent (60%) acetone, twenty-five percent (25%) isopropyl acetate and fifteen percent (15%) anhydrous isopropanol, similar to a compound sold under the trade name Isotone and which will hereafter be referred to as Isotone. The Isotone solvent found in nitrocellulose coating has an effect upon the outer surface of the molding material used in molding the article, which results in a firmer and harder outer surface being formed immediately inside the nitrocellulose coating. Articles coated with nitrocellulose material for some reason are more resilient and seem more lively than articles that have not been coated. Even though the nitrocellulose coating may be removed from the coated article, the article seems to retain the improved characteristics.

The article may be coated in a manner similar to that disclosed in my application for method of and apparatus for applying nitrocellulose coating, Serial No. 92,156 filed July 23, 1936. Another process for coating the article will now be described.

The article to be coated is dipped in nitrocellulose solution wherein Isotone or any other suitable solvent has been used. The coated article, if permitted to remain in the air for only a few minutes, will wrinkle and the surface become extremely irregular, the coating material tending to flow downwardly. The article, even though it may wrinkle, may then be sprayed with gasoline, methanol, or any other suitable solution that has an attraction for the solvent.

An article thus sprayed is placed in a cabinet having a considerable amount of fumes formed from the solvent used. The article instead of being sprayed with gasoline, methanol, or any other suitable spray out in the open, may be sprayed after being placed in the cabinet and sprayed in the presence of the fumes.

If the article is sprayed within the fume chamber, the atomized spray is visible within the chamber for a considerable length of time thereafter. The chamber then has a foggy or cloudy appearance. This seems to be the case regardless of the temperature within the range of normal atmospheric temperature. It is probable that as the article is oriented within the chamber having the fog or the mist of the spray solution this article will come in contact with particles of this mist, which further withdraws solvent, without any deleterious effect upon the outer surface of the coating. The orientation of the article causes the nitrocellulose material to be uniformly distributed throughout the surface of the article. The material sprayed upon the article draws a portion of the solvent out of the coating.

The fumes surrounding the article soften the outer surface of the coated article and in time cause the wrinkles to completely disappear from the surface. The article may be sprayed periodically by the gasoline, methanol or any other suitable solution having an attraction for the solvent, so as to remove more of the solvent. However, after each spraying operation it is necessary to orient the article in the presence of the medium having a considerable amount of the fumes of the solvent therein.

If the article is removed into the open air before the coating has set sufficiently, condensation will form upon the outer surface of the article and wrinkles form therein. When left in the open air before the coating is properly cured, pin holes will form in the outer surface of the coating, and blisters may form within the coating, both of which are probably caused by rapid accumulation of the fumes of the solvent.

If the article is removed into the open air for only a short period of time, the wrinkles formed in the outer surface and pin holes formed therein, may be removed by again placing the article in the fume chamber, where, for some reason, the fumes seem to cause the outer surface of the coating to soften and flow sufficiently to remove the wrinkles and eliminate the pin holes. The coating, of course, will not soften and pin holes will not be removed, if the article is exposed to the open air for too long a time.

The length of time of curing the coating is dependent upon a number of factors including the following; the ratio of the air to the fumes of the solvent in the curing compartment or the cabinet; the amount of solvent fumes withdrawn from the cabinet and air replaced; the amount of moisture in the air added from time to time; the amount and type of spray used; the viscosity of the nitrocellulose coating when first applied; the ingredients or the composition of the article that is coated, etc. If the article that is coated is made from material that has an attraction for the solvent used in dissolving the nitrocellulose material, as for instance, the bituminous material described above, the coating probably cures more rapidly, as some of the solvent flows into the body of the article.

The moisture in the air has an attraction for the solvent used in dissolving the nitrocellulose material. Any moisture in the air admitted in the compartment containing the fumes will at once attract the solvent either in a gaseous form or in liquid state, as the moisture will in all probability come in contact with the fumes before it actually comes in contact with the coated article. The affinity that the moisture will have for the solvent will be satisfied by the fumes of the solvent before most of the moisture comes in contact with the coated article. Upon the moisture being satisfied, no deleterious effect is produced upon the coating when the moisture eventually comes in contact therewith, as it already has had its affinity or attraction for the solvent satisfied. In other words, the moisture is practically saturated with the solvent before it forms condensation upon the coating.

In order to permit orientation of the article during the curing of the coating, a hole may be provided in the article for receiving a screw threaded stud for supporting the article while being oriented. After the coating has been cured the stud is removed by unscrewing.

A screw threaded pyroxylin plug, that is, a plug made out of suitable nitrocellulose material, having substantially the same diameter as the supporting stud, is then threaded into the hole vacated by the supporting stud. The outer end of the pyroxylin plug is burnished so as to present a surface flush with the outer surface of the coating. Before being threaded into the hole, the pyroxylin plug is preferably dipped or brought into contact with a solvent for the nitrocellulose material, so that its outer surface is somewhat plastic. When the plug is threaded into the aperture the solvent will also soften the adjacent coating of the article and will unite with the walls of the aperture due to the action of the solvent upon the bituminous filter used in the article, that is, when the articles that are coated are molded from a plastic molding material including a bituminous product. By being thus inserted, the pin is fixedly positioned by forming a homogeneous union with the contacting edges of the nitrocellulose material and by being united to the molding material.

This pyroxylin plug may have the same color as the color of the coating, or it may be of any other suitable color, either for ornamentation or as a symbol of the source or origin.

"Thermically sulphurized silica" wherever it appears in the claims, is used to designate silica and sulphur heated in the absence of free oxygen, to form a plastic mass. This mass is subsequently intermixed with suitable filler material such as asphalt and fibers.

Although the preferred modification of the process disclosed herein has been described, it will be understood that within the purview of this invention various changes may be made in the process, proportion of ingredients and their equivalents, which generally stated consist of a process capable of carrying out the objects set forth, in the novel ingredients used, combinations of steps and mode of operation, as disclosed and defined in the appended claims.

Having thus described my invention, I claim:

1. The process of producing a composition of matter suitable for use as a plastic molding material including the steps of fusing silica with sulphur into a homogeneous mass and subsequently intermixing the fused silica-sulphur mass with asphalt to form the plastic molding material.

2. The process of producing a composition of matter suitable for use as a plastic molding material including the steps of fusing silica and sulphur into a homogeneous mass, cooling the fused mass and subsequently intermixing the mass with Trinidad Lake asphalt, the mixture solidifying at ordinary atmospheric temperature to form the plastic molding material.

3. The process of producing a composition of material for use as a plastic material including the steps of heating silica and sulphur to melt the sulphur so as to form a mass and subsequently intermixing the mass with Trinidad Lake asphalt and a fibrous binding material.

4. A plastic molding material including thermically sulphurized silica intermixed with asphalt.

5. A plastic molding material including thermically sulphurized silica intermixed with asphalt having fibers therein.

6. A plastic molding material including thermically sulphurized silica and Trinidad Lake asphalt.

ELVIN M. BRIGHT.